UNITED STATES PATENT OFFICE 2,441,141

OPTICALLY ACTIVE BASIC AMINO ACID SALTS OF A STEREOISOMER OF CIS-2-(4'-CARBOXY - BUTYL)-3:4-UREIDO - TETRA-HYDROTHIOPHENE

Karl Folkers, Plainfield, and Donald E. Wolf, Rahway, N. J., assignors to Merck & Co., Inc., Rahway, N. J., a corporation of New Jersey No Drawing. Application September 16, 1944, Serial No. 554,461

12 Claims. (Cl. 260—309)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

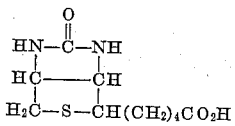

This compound can be synthesized as described in concurrently filed applications, Serial Nos. 554,458, 554,449, 554,450, 554,451, 554,452, 554,453, 554,454, 554,455, 554,456, 554,457. When thus synthesized, racemates of stereoisomers of 2-(4'-carboxy-butyl)-3:4-ureido-tetrahydrothiophene, identified by the configuration of the precursor 3:4-diamino-intermediate, are obtained as follows:

1. A racemate of trans-allo-stereoisomers, melting point of about 194–196° C.;
2. A racemate of cis-stereoisomers, melting point about 232° C.; and
3. A racemate of trans-epiallo-stereoisomers, melting point above 195° C. (with decomposition).

The present invention is concerned with resolution of the stereoisomers of the second racemate (M. P. about 232° C.) above mentioned.

In accordance with the present invention, dl-cis-2-(4'-carboxy-butyl)-3:4-ureido-tetrahydrothiophene (M. P. about 232° C.) is reacted with a stereoisomeric form of an optically active basic amino acid to form a mixture of basic amino acid salts of the stereoisomers of the first mentioned carboxy compound, and the mixture is then separated into its components by fractional crystallization followed by decomposition of the salts to obtain the resolved stereoisomers.

The term basic amino acid as here employed is understood to include optically active simple amino-carboxylic acids having a molecular structure such that more amino or equivalent basic groups than carboxy groups are present, viz. diaminoalkyl-mono-carboxylic acids such as lysine or the like; arginine, or equivalent compounds within the genus above set forth. It is presently preferred to practice the process utilizing l-(+) arginine.

The following examples illustrate methods of carrying out the present invention, but it is to be understood that these examples are given by way of illustration and not of limitation.

Example 1

About 100 parts by weight of dl-cis-2-(4'-carboxy-butyl) 3:4-ureido-tetrahydrothiophene and 77.8 parts by weight of 1-(+)-arginine are dissolved in water to yield a clear solution; about 4 volumes of isopropanol are added and, upon standing and chilling, a crystalline precipitate of the l-(+)-arginine salt of d-cis-2-(4'-carboxy-butyl) 3:4-ureido-tetrahydrothiophene (M. P. 228–230° C. d.) is formed and removed by filtration. This salt is decomposed by an aqueous solution of a mineral acid, yielding biotin (M. P. 229–231° C.).

Example 2

About 70.84 g. of dl-cis-2-(4'-carboxy-butyl)-3:4-ureido-tetrahydrothiophene (M. P. 232.5-233.5° C.) is added to a solution of 56.55 g. of 1-(+)-arginine in 983 cc. of water and, after a clear solution is obtained by agitation, about 4400 cc. of isopropanol is added and the mixture is further agitated until a clear solution is obtained. Upon standing and chilling at 0° C., the l-(+)-arginine salt of the di-isomer as described in Example 1 is obtained as a precipitate which is removed by filtration and purified by recrystallization from aqueous alcohol. The corresponding salt of the l-isomer can be recovered from the supernatant liquor upon evaporation. Upon decomposition of the salt of the d-isomer with dilute hydrochloric acid, biotin is obtained as described in Example 1.

Modifications may be made in carrying out the present invention without departing from the spirit and scope thereof and the invention is to be limited only by the appended claims.

What is claimed is:

1. An optically active basic amino acid salt of a stereoisomer of cis-2-(4'-carboxy-butyl)-3:4-ureido-tetrahydrothiophene.

2. An optically active basic amino acid salt of the dextrorotatory stereoisomer of cis-2-(4'-carboxy-butyl)-3:4-ureido-tetrahydrothiophene.

3. The l-(+)-arginine salt of d-cis-2-(4'-carboxybutyl)-3:4-ureido-tetrahydrothiophene.

4. The l-(+)-arginine salt of a stereoisomer of cis-2-(4'-carboxybutyl)-3:4-ureido - tetrahydrothiophene.

5. The process that comprises reacting a mixture of the stereoisomers of cis-2-(4'-carboxybutyl)-3:4-ureido-tetrahydrothiophene with a substantially pure stereoisomer of an optically active basic amino acid to form a mixture of salts of said amino acid with said stereoisomers, and separating said mixture of salts by fractional crystallization from an aqueous solution.

6. The process that comprises reacting a mixture of the stereoisomers of cis-2-(4'-carboxybutyl)-3:4-ureido-tetrahydrothiophene with a substantially pure stereoisomer of an opticaly active basic amino acid to form a mixture of salts of said amino acid with said stereoisomers, fractionally crystallizing said mixture of salts from an aqueous solution to produce the corresponding salt of one of said stereoisomers, and decomposing said salt by treatment with an aqueous solution of a mineral acid to obtain the stereoisomer.

7. The process that comprises reacting, in aqueous solution, a mixture of the stereoisomers of cis-2-(4'-carboxy-butyl)-3:4-ureido-tetrahydrothiophene with a substantially pure stereoisomer of an optically active basic amino acid to form a mixture of salts of said amino acid with said stereoisomers, fractionally crystallizing said mixture of salts from an aqueous isopropanol solution to produce the corresponding salt of one of said stereoisomers, and decomposing said salt by treatment with an aqueous solution of a mineral acid to obtain the stereoisomer.

8. The process that comprises reacting a mixture of stereoisomers of cis-2-(4'-carboxy-butyl)-3:4-ureido-tetrahydrothiophene with substantially pure 1-(+)-arginine to form a mixture of arginine salts of said stereoisomers, and separating said mixture of salts by fractional crystallization from an aqueous solution.

9. The process that comprises reacting a mixture of stereoisomers of cis-2-(4'-carboxy-butyl)-3:4-ureido-tetrahydrothiophene with substantially pure 1-(+)-arginine to form a mixture of arginine salts of said stereoisomers, fractionally crystallizing said mixture of salts from an aqueous solution to produce the 1-(+)-arginine salt of one of said stereoisomers, and decomposing said salt by treatment with an aqueous solution of a mineral acid to obtain the stereoisomer.

10. The process that comprises reacting, in aqueous solution, a mixture of stereoisomers of cis-2-(4'-carboxy-butyl)-3:4-ureido-tetrahydrothiophene with substantially pure 1-(+)-arginine to form a mixture of arginine salts of said stereoisomers, fractionally crystallizing said mixture of salts from an aqueous isopropanol solution to produce the 1-(+)-arginine salt of one of said stereoisomers, and decomposing said salt by treatment with an aqueous solution of a mineral acid to obtain the stereoisomer.

11. The process that comprises separating the salts of the optical isomers of cis-2-(4'-carboxybutyl)-3:4-ureido-tetrahydrothiophene with an optically active basic amino acid, from each other, by fractional crystallization from an aqueous solution.

12. The process of recovering the 1-(+)-arginine salt of d-cis-2-(4'-carboxy-butyl)-3:4-ureido-tetrahydrothiophene from a mixture containing that salt and the corresponding salt of 1-cis-2-(4'-carboxy-butyl)-3:4-ureido-tetrahydrothiophene, which comprises dissolving said mixture of salts in an aqueous solution and precipitating the sparingly soluble 1-(+)-arginine salt of d-cis-2-(4'-carboxy-butyl)-3:4-ureido-tetrahydrothiophene from said solution by adding isopropanol.

KARL FOLKERS.
DONALD E. WOLF.

REFERENCES CITED

The following references are of record in the file of this patent:

UNITED STATES PATENTS

| Number | Name | Date |
| --- | --- | --- |
| 2,374,212 | Karabinos et al. | Apr. 24, 1945 |

OTHER REFERENCES

Science, vol. 94 (Sept. 26, 1941), pages 308, 309; ibid., vol. 97 (May 14, 1943), pages 447, 448.

Jour. Am. Chem. Soc., vol. 66 (Jan. 1944), page 157.

Rosenberg: "Chemistry and physiology of the vitamins," Inter-Science, pub. N. Y. (1942), pages 471–472.